United States Patent
Andrews et al.

(12)

(10) Patent No.: US 6,318,903 B1
(45) Date of Patent: Nov. 20, 2001

(54) OPTICAL FIBER CONNECTOR FOR BACKPLANE

(75) Inventors: Scott R. Andrews, Dacula; Elizabeth J. Driscoll, Dekalb County; Norman Roger Lampert, Norcross; Troy Barrett Mock, Lawrenceville; Gregory A. Sandels, Buford; Naif Taleb Subh, Lawrenceville, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,291

(22) Filed: Feb. 29, 2000

(51) Int. Cl.[7] ........................................ G02B 6/36
(52) U.S. Cl. ................................................ 385/77
(58) Field of Search .................... 385/76–78, 86, 385/95, 100, 147

(56) References Cited

U.S. PATENT DOCUMENTS

| | | | |
|---|---|---|---|
| Re. 37,079 | * | 3/2001 | Stephenson et al. ............... 385/78 |
| Re. 37,080 | * | 3/2001 | Stephenson et al. ............... 385/78 |
| 5,212,752 | * | 5/1993 | Stephenson et al. ............... 385/78 |

* cited by examiner

*Primary Examiner*—Akm E. Ullah
(74) *Attorney, Agent, or Firm*—Thomas, Kayden, Horstemeyer & Risley, LLP (57) ABSTRACT

A plug type connector is adapted to be latched to a backplane wall in a fixed position and has a tapered front, nose or connector end for insertion into an adapter which plugs into the backplane wall. The adapter may be misaligned in any or all of the X, Y, Z axes. The tapered nose cams the X or Y misaligned adapter into axial alignment as the adapter and its mount are being inserted. A shortened front or connector end of the connector causes the ferrule of the connector to project beyond the optical plane of the connection so that it reaches a ferrule in a Z aligned adapter to complete the connection. A coil spring within the housing of the connector is tuned to allow counter movement of the ferrule where the ferrule in the adapter is too long, thereby shifting the position of the optical plane. The connector has a ferrule-barrel assembly within a housing and an insert member which has an enlarged diameter portion which is contained by openings in the housing to prevent rotation of the ferrule-barrel assembly.

12 Claims, 6 Drawing Sheets

OPTICAL FIBER CONNECTOR FOR BACKPLANE

RELATED APPLICATIONS

This application is related to U.S. patent application Ser. No. 09/515,976, filed on Feb. 29, 2000, entitled "Panel Mounting Assembly for Optical Fiber Connectors," and U.S. patent application Ser. No. 09/515,998, filed Feb. 29, 2000, and entitled "Interconnection System for Optical Circuit Boards," both filed concurrently with the present application.

FIELD OF THE INVENTION

This invention relates to an optical fiber connector and, more particularly to a plug type optical fiber connector particularly for backplane connections.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that the mode field diameter of, for example, a singlemode fiber is approximately nine (9) microns (0.009 mm). Good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects. These same considerations apply to arrangements where the fiber, terminated in a plug connector, is to be used with active or passive devices, such as, for example, computers or transceivers and the like.

In the present day state of the art, there are numerous, different, connector designs in use for achieving low insertion loss and stability. In most of these designs, a pair of ferrules (one in each connector or one in the connector and one in the apparatus or device), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable. Alternatively, a device meant to accept a connector with the ferrule aligned in a bore and which comes to rest at a stop in the optical plane is acceptable.

Alignment variations between a pair of connectors can be the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage. The resultant eccentricity vector has two components, magnitude and direction. Where two connectors are interconnected, rotation of one of them will, where eccentricity is present, change the relative position of the fibers, with a consequent increase or decrease in the insertion loss of the connections. Where the magnitude of the eccentricities are approximately equal the direction component is governing, and relative rotation of the connectors until alignment is achieved will produce maximum coupling.

In U.S. patent application Ser. No. 09/363,908, of Andrews et al., filed Jul. 28, 1999, now pending there is shown an arrangement for "tuning" a connector to achieve optimum direction of its eccentricity.

Unfortunately, there are a number of other problems affecting insertion loss of the plug connection, particularly where the connector plug, which terminates, for example, a jumper cable, is used to connect through a backplane to, generally, a piece of equipment having a connector adapter or connector receiving means mounted thereon. By "backplane" is meant, generally, a wall which separates internal apparatus from external apparatus, and through which a connection or connections are made. Thus the interior apparatus may comprise printed wiring boards (PWBs) having connector adapters mounted thereon (a circuit pack) which mate with plug connectors, such as LC type connectors which are mounted in the backplane. The backplane may also comprise a mounting panel as in a switch box, with the apparatus on one side thereof and the plug connectors insertable from the other side. In general use, the floating connector is affixed to the backplane, and the circuit pack is plugged into the backplane as needed to mate with the backplane connector plug.

In all such arrangements, manufacturing tolerances can add up to serious misalignments in any of the X, Y, or Z axes. Thus when a coupling adapter or device receptacle with a circuit pack is mounted on a PWB, the PWB mount, the adapter mount, the adapter itself and the latching mechanism of the circuit pack, which have all been made to be within certain tolerance limits, could, for example, all be at the extreme tolerance limits, thus presenting a particular misalignment of the adapter connector ferrule receptacle along one or more of the X, Y, Z axes. When an adapter is inserted into the wall of the backplane, it may be seriously misaligned with the ferrule which is latched to a receptacle on the backplane. In many instances the insertion of the adapter into the plug is blind, i.e., the operator cannot see one or the other coupling components, and the operator cannot easily feel for the correct position. This results in damage to the ferrule of the plug. As a consequence, insertion loss may be increased to an undesirable level. In extreme cases, connection might not be possible. In addition, severe improper Z axis travel of the ferrule can result in twisting of the ferrule barrel of the connector, resulting in de-tuning of the plug connector when it has been tuned.

In addition, in a backplane wall in the Z axis, a standard LC plug connector may not be long enough to insure that the spacing between the optical plane, where the backplane plug ferrule abuts the device stop or ferrule assembly in the abut, and a reference face in the front of the backplane remains the same regardless of the backplane thickness. If it does not, proper abutment of the two ferrules may not occur, thereby causing a material increase in insertion loss.

SUMMARY OF THE INVENTION

The present invention is a modified plug connector designed to be usable in a connection regardless of tolerance discrepancies, and which insures the desired insertion loss regardless thereof.

As discussed hereinafter, the principles of the invention are incorporated in an LC type connector, but it is to be understood that these principles are applicable to other types of connectors as well.

In greater detail, the basic components of the connector comprise a ferrule-barrel assembly for holding the end of an optical fiber extending axially there through and a plug housing member which contains the ferrule-barrel assembly. A coil spring member contained within the housing surrounds the barrel and bears against an interior portion of the housing and an enlarged barrel member, thereby supplying forward bias to the ferrule assembly relative to the housing. In accordance with one aspect of the invention, the housing has a length extending from a cable entrance end to a connection end which terminates in a nose portion, that is great enough to enable insertion into the adapter regardless of the backplane thickness. The housing has a latching arm thereon, an insert member, a crimp member, and a rear yoke member having a trigger thereon for actuating the latching arm, and the overall length is such that the trigger member remains accessible regardless of the backplane thickness. The coil spring is likewise of increased length and affords to the ferrule a greater amount of travel on the axis to accommodate some Z direction misalignment of the adapter to which connection is to be made. This greater than normal travel insures that the ferrule will reach, and butt with the adapter ferrule despite, for example, the adapter being mounted too great or too little a distance in the Z direction from a reference plane defined by the front surface of the backplane.

In accordance with another aspect of the invention, the insert member, which functions as a strength member, has an enlarged diameter portion having locating flats thereon forming a truncated cylindrical portion that keeps with openings in the sidewalls of the housing to seat the insert firmly in place axially to resist axial pull. The insert member is affixed to the barrel-ferrule assembly which, consequently, is prevented from rotating within the housing. The ferrule-barrel assembly has a hex-shaped barrel that sits in a hex-shaped opening or recess in the housing bore. The barrel can be unseated and rotated to any of six positions to tune the connector to achieve optimum optical loss. Mounted on the rear portion of the insert member is a crimping member which is surrounded by a clip or yoke member having a trigger or activating arm mounted thereon. The crimping member is used to affix the strength members, e.g. aramid fibers, to the rear of the insert member to attach the cable to the connector.

In accordance with another aspect of the invention, the latching arm on the connector is positioned to latch to a backplane receptacle at a point approximately in the reference plane, or in a fixed position relative thereto, of the backplane. This has the beneficial effect of latching the connector to the backplane in the same place relative thereto regardless of the thickness of the backplane, while leaving the trigger accessible for un-latching the connector when necessary.

Because, as pointed out hereinbefore the adapter may be misaligned in the X and Y axes as a result of conflicting manufacturing tolerances, the nose portion of the connector housing is chamfered. The sloping surfaces of the chamfer serve as lead-ins for the adapters and function to cam the adapter or device receptacle into alignment with the ferrule of the backplane plug connector.

These and other principles and features of the present invention will be more readily understood from the following detailed description, read in conjunction with the accompanying drawings.

DETAILED DESCRIPTION

Figures 1, 2A:
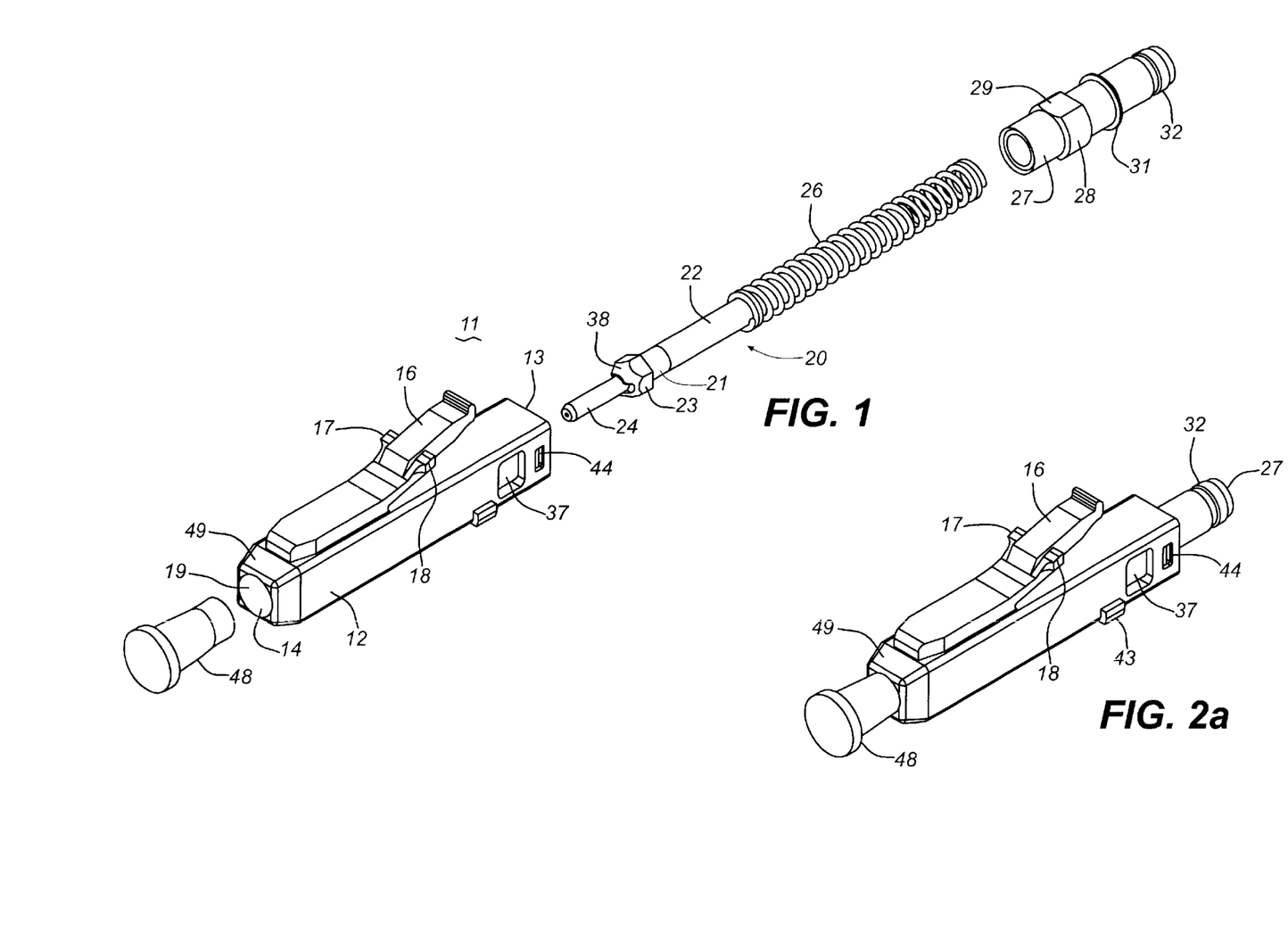
FIG. 1 is an exploded perspective view of the basic elements of the plug connector of the present invention.
FIG. 2(a) is a perspective view of the connector of FIG. 1 as partially assembled.

FIG. 1 is an exploded perspective view of the plug connector 11 of the present invention which, as depicted, is an LC type connector having a unitary housing 12 which, as pointed out hereinbefore has a length from the cable entrance end 13 to the connector or ferrule end 14 that is sufficient to make the connector 11 usable over a wide range of backplane thicknesses. As such, the connector 11 is considerably longer than the standard LC connector. A latching arm 16, having first and second latching lugs 17 and 18 extends from housing 12, for latching the connector 11 in place. As will be discussed more fully hereinafter, the axial location of the latching lugs 17 and 18 is important to the proper functioning of connector 11. Housing 12 and latching arm 16 are preferably made of a suitable plastic material and, preferably are molded therefrom in a one piece structure. The plastic material should have sufficient resilience to allow the latching arm 16 to be depressed and to spring back to its non-depressed (latching) position, thereby forming a "living" hinge. Housing 12 has an axial bore 19 extending therethrough which accommodates a ferrule-barrel assembly 20. Assembly 20 comprises a flexible hollow tubular member 22 attached to a metal or hard plastic barrel member 21 with an enlarged flange 23 from which extends a ferrule 24 which may be of a suitably hard and wear resistant material such as, preferably, ceramic, glass, or metal and which functions to contain an optical fiber therein. A coil spring 26 surrounds tubular member 22 and seats against the rear of flange 23 at its forward end, and against an insert 27 at its rear end. Insert 27 is tubular and accommodates tubular member 22.

Figure 2B:
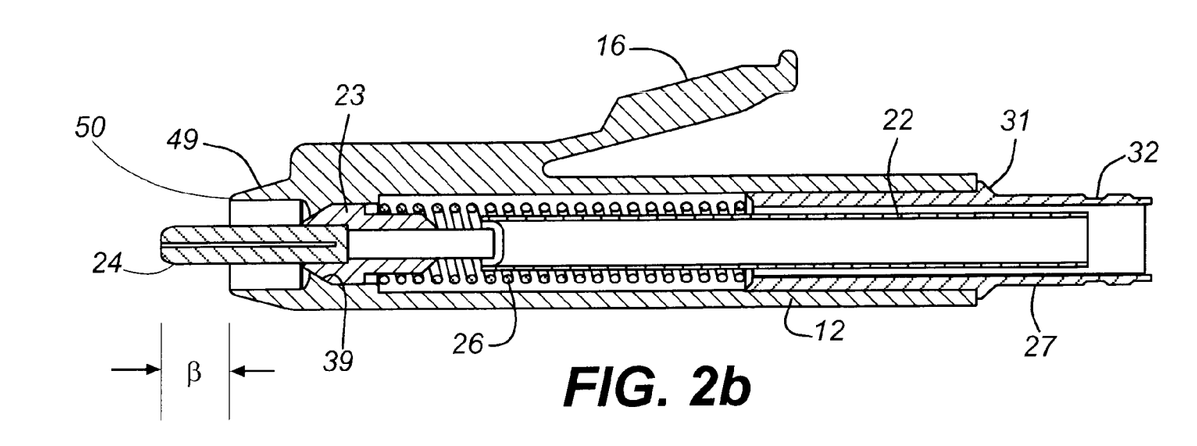
FIG. 2(b) is a cross-sectional view of the connector of FIG. 1.
Figure 2C:
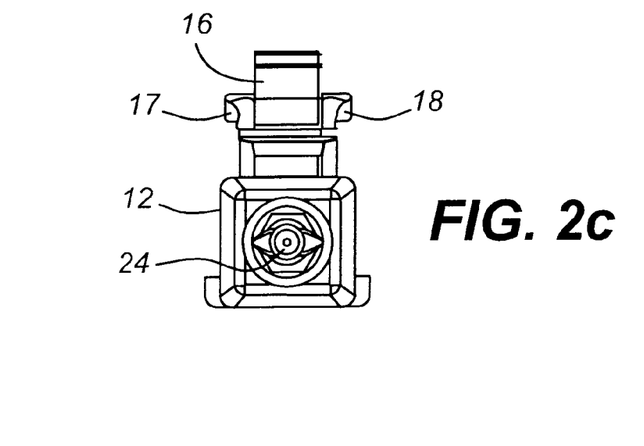
FIG. 2(c) is a front elevation view of the connector of FIG. 1.

Insert 27 has an enlarged diameter section 28 having first and second flats 29 (only one of which is shown) thereon which enable insertion of insert 27 into the end of bore 19 at the cable entrance end 13 of housing 12, which has a generally square configuration as is shown, for example, in U.S. patent application Ser. No. 09/413,431 of Driscoll et al. filed Oct. 6, 1999. Insert 27 also has a flange 31 thereon which functions as a stop to prevent insert 27 from being inserted too far into housing 12, as best seen in FIG. 2(b). FIGS. 2(a), 2(b), and 2(c) are a perspective view, a cross-sectional elevation view, and a front elevation view, respectively, of the connector 11 of FIG. 1.

Figures 3, 4:
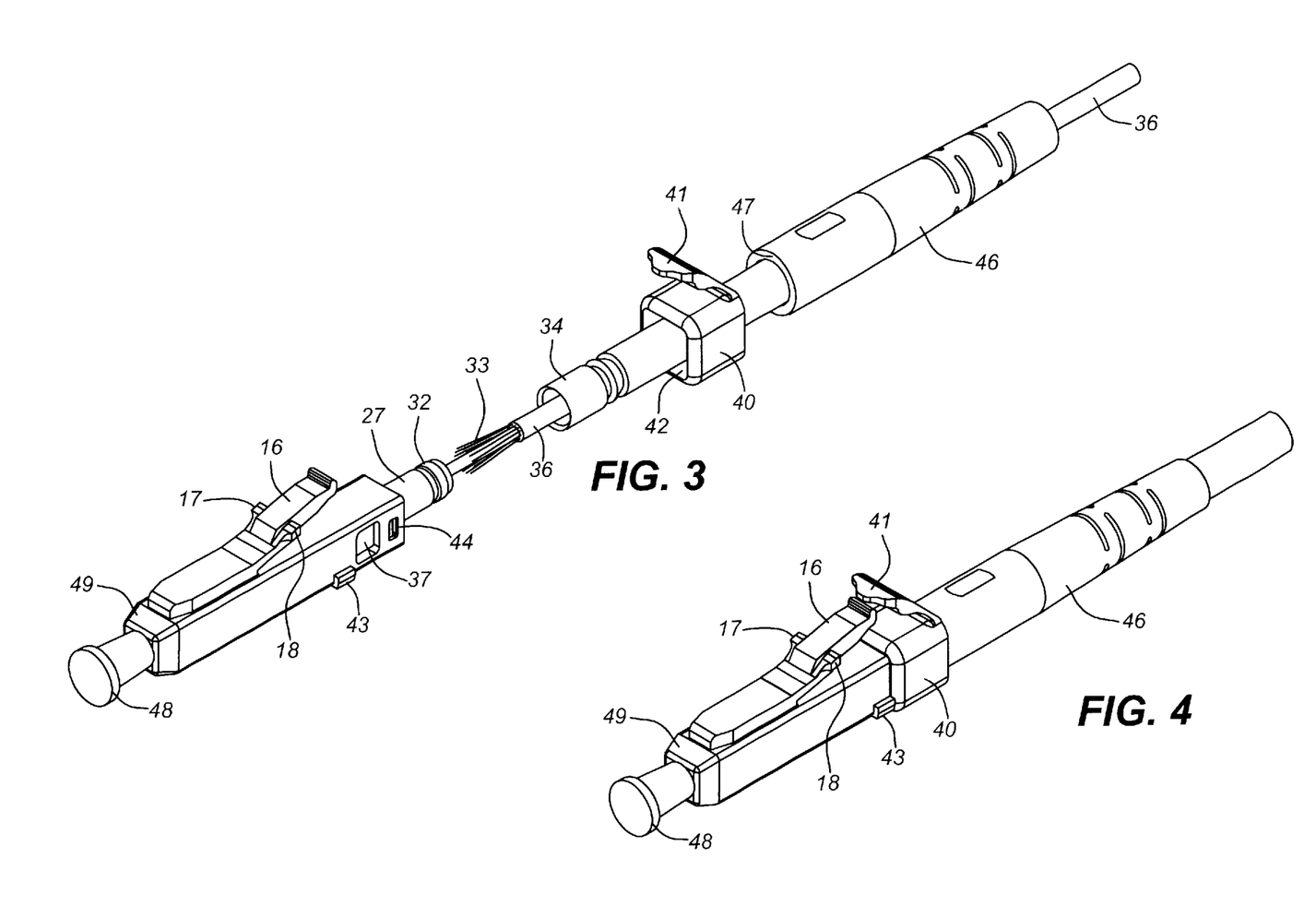
FIG. 3 is an exploded perspective view of a jumper cable as terminated by the connector of FIG. 1.
FIG. 4 is a perspective view of the assembled termination of the jumper cable.

At the cable receiving end of insert 27 is a groove 32 which is designed to receive the strength members, usually aramid fibers 33, which are affixed thereto by means of a crimping member 34 as best seen in FIG. 3, thereby anchoring the incoming fiber cable 36 to connector 11. As best seen in FIG. 1, each of the sidewalls of housing 12, has an opening 37, only one of which is shown, therein for receiving the enlarged diameter portion 28 of insert 27 and which functions to affix the insert 27 longitudinally, i.e., the Z direction, within housing 12. The flats 24—24 of insert 27 are received within the walls at the cable entrance end 13 to prevent rotation thereof.

The front end of flange 23 has a polygonal shape, preferably hexagonal, with a slope 38 which is adapted to seat in a sloped recess portion 39 of bore 19, as best seen in FIG. 2(b). Recess portion 39 likewise has a polygonal shape adapted to receive flange 23 in any of, in the case of a hexagonal shape, six positions for tuning the connector. The tuning process is fully shown and explained in U.S. patent application Ser. No. 06/363,908 of Anderson et al., filed Jul. 28, 1999, the disclosure of which is incorporated herein by reference.

Figure 5:
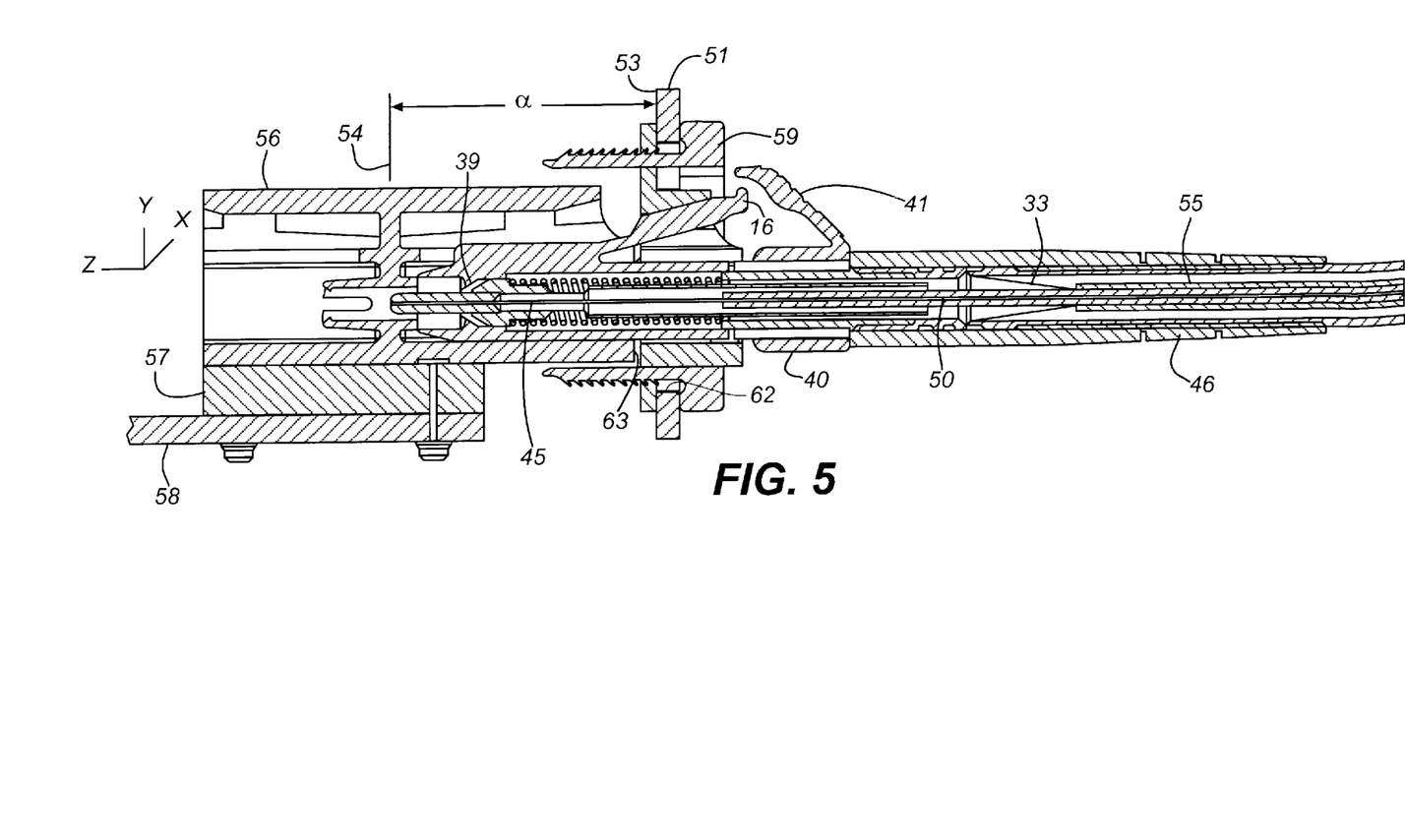
FIG. 5 is a sectional arrangement of FIG. 4 as used as a backplane connector for a thin walled backplane.

FIGS. 3 and 4 are perspective views of, respectively, the disassembled and assembled connector 11 as a termination of, for example, a jumper cable 36 which comprises, as shown in FIG. 5, a fiber 45, a buffer layer 50 and an insulating protective layer 55 having strength members 33 therein. In addition to the parts discussed hereinbefore, connector 11 also includes a clip member 40 having a trigger arm 41 thereon. Clip member 40 has a rectangular or square bore 42 and is designed to be a slip fit on the cable receiving end of housing 12 as shown in FIG. 4. Stop members 43, only one of which is shown, function to locate clip member 40 longitudinally, and its latches to housing 12 by means of internal latches, not shown, which mate with latch openings 44, only one of which is shown, in housing member 12. A protective boot 46 extends from the rear of clip 44, and prevents the yoke 40 from moving reward after assembly. The boot 46 has a bore 47 which surrounds and grips the crimping member 34. A protective dust cap 48, insertable in the ferrule or connection end 14 of the housing 12 protects the ferrule 24 when the connector is assembled, inasmuch as ferrule 24 projects beyond the end of housing 12, as best seen in FIG. 2(b) a distance β which may be, for example, approximately 0.10 (α 2.41 mm) inches, which is in a standard LC connector, approximately 0.07 inches (1.78 mm).

In accordance with the invention, the ferrule or connector end 14 of housing 12 has a tapered nose portion 49 having a front tip end 50 which surrounds the ferrule 24, as best seen in FIG. 2(b). As will be discussed more fully hereinafter, the tapered portion functions to align the connector 11 with an adapter or other device to which connector 11 is to be mated. The tapered portion is formed by removal of at least 30% of the material of the housing at the front tip 50 of the nose. In practice, it has been found that 70% removal yields excellent results. The nose portion results in a connector end 14 of the housing in the area of bore 19 that is somewhat shorter than in a standard LC connector housing, and, as a consequence, ferrule 24 projects farther outward from the housing which, as will be made clear hereinafter, makes proper alignment in the Z direction possible.

In use, the connector 11 is mounted in, and latched to a receptacle in the backplane wall from one side thereof, and a PWB or other device, preferably having an adapter or similar connector receiving device thereon is, usually subsequently, mounted to a circuit pack (not shown) on the other side of the backplane wall and makes connection with the plug connector 11. This connection arrangement is shown in FIG. 5 for a thin backplane wall 51 and in FIG. 6 for a relatively thick backplane wall 52. In either instance, the front surface 53 of the backplane wall 51 or 52 is a reference surface which, under normal usage is a fixed distance α from the optical plane 54 which is the plane in which ferrule 24 abuts with the device ferrule (not shown) within an adapter 56. This distance may be, for example, 0.640 inches (16.26 mm). The adapter 56 is shown mounted on a spacer block 57 which is affixed to a PWB 58 so that, when PWB 58 is part of a circuit pack and latching arrangement (not shown) on the left hand side as viewed in FIGS. 5 and 6, the centerline of adapter 56 is coincident with the centerline of plug connector 11, which is mounted in a suitable receptacle 59 of the type, for example, shown in copending U.S. patent application Ser. No. 09/515,998, filed Feb. 29, 2000, and entitled "Interconnection System for Optical Circuit Boards." As can be seen in the figures, receptacle 59 is adjustable for different widths of backplane walls 51, 52, and plug connector 11 is always latched therein in a fixed position relative to reference plane 53. In addition, the length of housing 12 is such that trigger 41 is accessible, regardless of the width of wall 51, 52 by pushing forward on trigger 41 which will interact with latch arm 16 to unlatch lugs 17 and 18. Receptacle 59 resides within a bore 62 in backplanes 51, 52 which, as can be seen, is slightly larger than the transverse dimension of the receptacle 59 therein. Thus, although connector 11 is held fixed in the Z direction in the back direction, receptacle 59 and hence plug 11 can be moved slightly in the forward Z direction for unlatching and in the X and Y directions. As will be explained hereinafter, such slight movement is important to the goal of achieving proper alignment of adapter 56 and plug connector 11.

Figure 6:
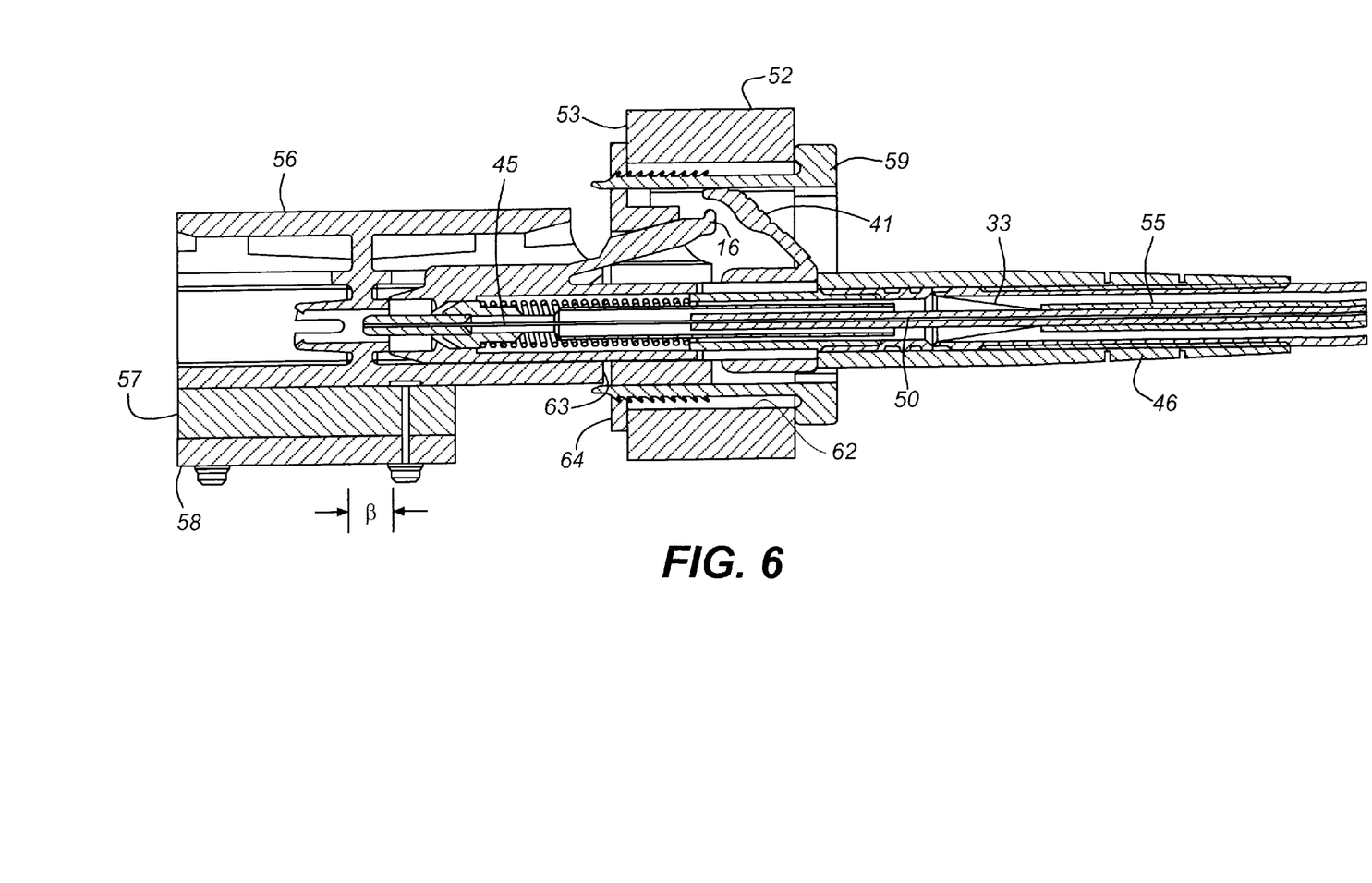
FIG. 6 is a sectional elevation view of the connector arrangement of FIG. 4 as used as a backplane connector for a thick walled backplane.

The added length of housing 12 makes possible somewhat better calibration of spring member 26 as to the force necessary to compress it slightly and also as to its restoring force, both of which involve movement of the ferrule-barrel assembly 21 against the barrel or flange 23 thereof spring 26 bears. As seen in FIGS. 5 and 6, the end of ferrule 24 is shown as lying in the optical plane 54. This is for illustrative purposes only, inasmuch as, initially, the end of ferrule 24 will protrude beyond the optical plane 54 to its full extension β. This can be seen by the fact that the sloping surface 38 on flange or barrel 23 is not seated on the recessed portion 39 of bore 19. When fully seated by the pressure of spring 26, ferrule 24 extends beyond the optical plane 54 for the distance β.

When PWB is then plugged into its socket or mounting, not shown, assuming, for purposes of illustration, that adapter 56, which has a connector equipped with a ferrule, not shown, therein, is misaligned in all three axes X, Y, and Z. If the ferrule therein, not shown, extends beyond the optical plane 54, it will, when it butts against the end of ferrule 24, push ferrule 24 toward the backplane against the pressure of spring 26. Spring 26 is calibrated to allow such retrograde movement of ferrule 24 a distance of approximately 0.06 inches, altering the projection distance α from 0.100 inches (2.41mm) for example to 0.040 (1.14 mm) inches. In a standard plug connector, the range of movement is approximately 0.05 to 0.07 inches, which is insufficient for backplane connections in cases of misalignment especially in the Z direction. Thus, connector 11 compensates for such misalignment on the Z axis. On the other hand, if the ferrule in adapter 56 is too short to reach the optical plane 54, the added length of ferrule 24 from the shortening of connector 11 in the connection end 14, the end of which extends beyond the optical plane, can compensate therefor.

In any case, the optical plane is moved from the α position relative to the reference surface 53.

If the adapter 56 is misaligned in the X and/or Y directions, the end of the adapter 63 encounters the sloped nose 49 and is cammed into alignment thereby. In an extreme case, the misalignment may be so great as to force the connector 11 to move. Inasmuch as the receptacle 59 holds the connector 11 in a fixed position, the receptacle itself moves within its bore in the X and Y directions to accommodate the misalignment. Such flexibility of the plug connector 11 of the invention in adapting to misalignments of the devices with which it is connected results in drastic improvements in the insertion loss over what would normally be the case.

Figure 7:
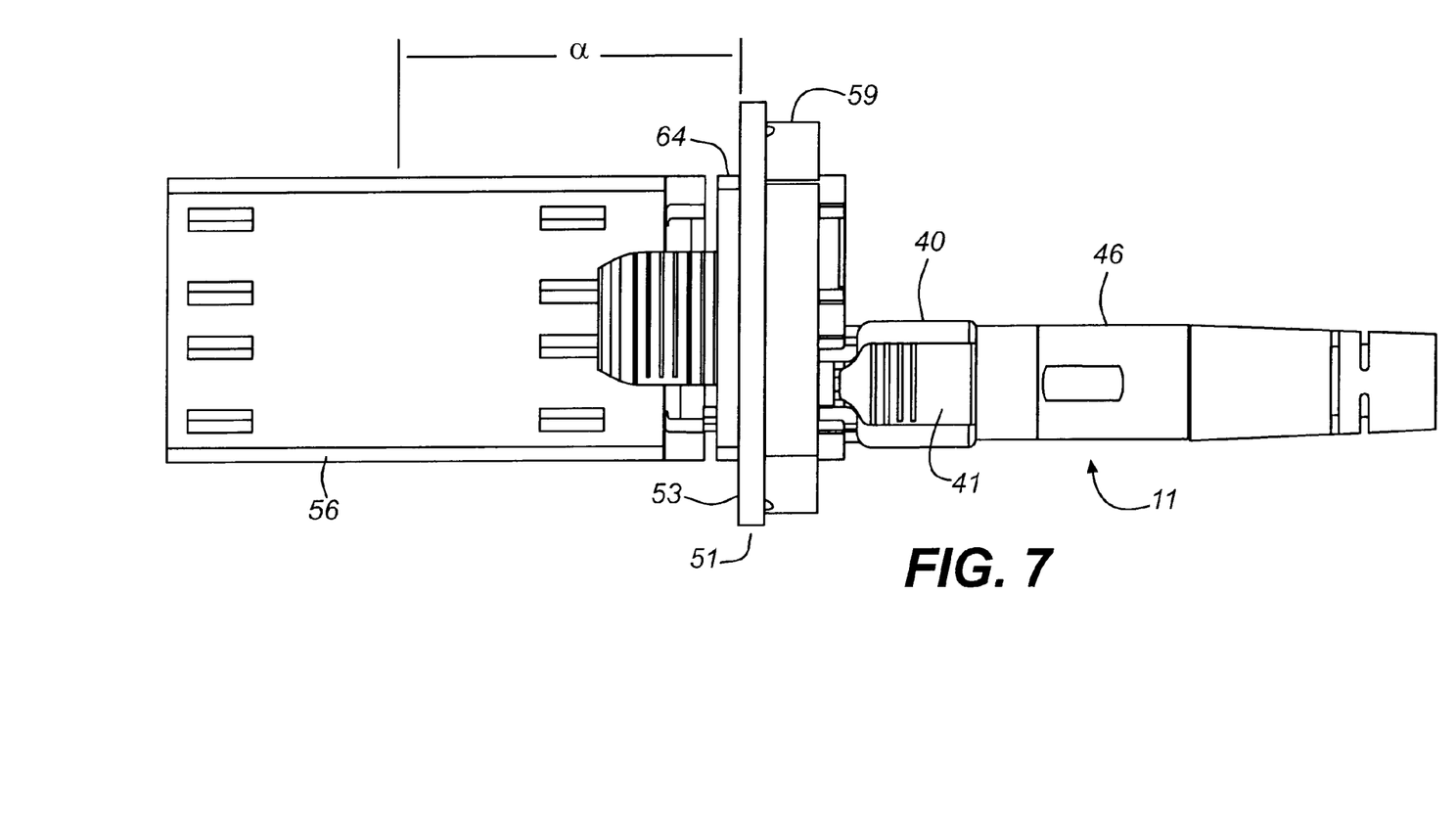
FIG. 7 is a top plan view of the backplane connector of the invention as used in a duplex connector arrangement.

FIG. 7 is a plan view of the connector 11 as mounted in a duplex receptacle 64 for use with a duplex adapter 56.

The plug connector of the invention as described in the foregoing, is rotation controlled in part at least because of the fit of the flats 29—29 in cooperation with the enlarged diameter portion 28 in sidewall openings 37, which also increase the pull-out strength as a guard against accidental pull-out, and produces far better insertion loss performance than prior art connectors in backplane applications, as well as affording rotation control.

It is to be understood that the various features of the present invention might readily be incorporated into other types of connectors, and that other modifications or adaptations might occur to those skilled in the art. All such variations and/or modifications are intended to be included herein as being within the scope of the present invention as set forth hereinbefore. Further, in the claims hereafter, the corresponding structures, materials, or acts and equivalents of all means or step-plug-function elements are intended to include any structure, material, or acts for performing the functions in combination with other elements as specifically claimed.

What is claimed is:

1. A connector for terminating an optical fiber comprising:
    an elongated housing member having an axial bore extending therethrough, said housing member having a connector end and a cable receiving end;
    a ferrule-barrel assembly within said bore, said ferrule-barrel assembly comprising a tubular member having an enlarged flange at one end thereof from which axially projects a ferrule adapted to contain a fiber therein, said flange having a polygonally shaped portion and a tapered portion leading from said polygonally shaped portion to said ferrule;
    said bore having a tapered recessed portion thereon forming a seat for said tapered portion of said flange;
    a spring member within said housing member surrounding said ferrule-barrel assembly and in contact with said flange to force said tapered portion into seating engagement with said recess in said bore; and
    said housing member having a sloped nose portion at said connector end through which said ferrule passes beyond the end of said nose portion a distance β sufficient to connect with a misaligned adapter for receiving said plug connector.

2. A connector as claimed in claim 1 wherein said slope is formed by removal of at least 30% of the housing material at said tip end.

3. A connector as claimed in claim 2 wherein said slope is formed by the removal of about 70% of the housing material at said tip end.

4. A connector as claimed in claim 1 wherein the distance β is approximately 0.10 inches.

5. A connector as claimed in claim 1 wherein said spring member permits travel of the ferrule in an axial direction of approximately 0.06 inches.

6. A connector as claimed in claim 5 wherein $0.1 \geq \beta \geq 0.04$ inches.

7. A connector as claimed in claim 1 and further comprising:
    a cylindrical insert member, said insert member being insertable within said housing member at said cable receiving end, said insert member having an enlarged diameter portion, and wherein said housing member has first and second side walls each having an opening therein for receiving said enlarged diameter portion.

8. A connector as claimed in claim 1 and further comprising a latching arm extending from a surface of said housing member, said latching arm having a first latching lug thereon for latching said connector to a receptacle mounted in a backplane.

9. A connector terminated optical fiber cable, said cable comprising:
    an optical fiber surrounded by a protective layer;
    said protective layer having stranded strength members therein;
    a connector termination comprising an elongated housing having a connector end and a cable receiving end and a central bore extending axially therethrough in a Z direction;
    a ferrule-barrel assembly within said bore comprising a tubular member surrounding said optical fiber and having an enlarged flange at one end thereof;
    a ferrule projecting from said flange, said ferrule containing said optical fiber;
    said flange having a polygonally shaped portion and a tapered portion extending from said polygonally shaped portion to said ferrule;
    said bore having a tapered recess portion therein forming a seat for said tapered portion of said flange;
    a spring member within said housing and surrounding said ferrule-barrel assembly over a portion of its length, said spring member forcing said tapered portion of said flange into seating engagement with said tapered recess portion;
    said housing having, at its connector end, a sloped nose portion through which said ferrule containing said optical fiber extends a distance β beyond the end of said sloped nose portion.

10. A connector terminated optical cable as claimed in claim 9 and further comprising;
    an inserted member within said housing and surrounding a portion of the length of said ferrule-barrel assembly, said insert member forming a seat for one end of said spring; and
    said insert member having grooves therein to which said strength members are affixed.

11. A connector terminated optical fiber cable as claimed in claim 10 and further comprising a yoke member surrounding said housing at its cable entrance end and having a trigger arm having a distal end which overlies a distal end of a latching arm on said housing.

12. A connector terminated optical fiber cable as claimed in claim 10 wherein said spring allows axial movement of said ferrule-barrel assembly over a distance of approximately 0.06 inches.

* * * * *